April 15, 1969     A. J. STONE     3,438,686
BEARING SUPPORT BUSHING
Filed Jan. 23, 1967
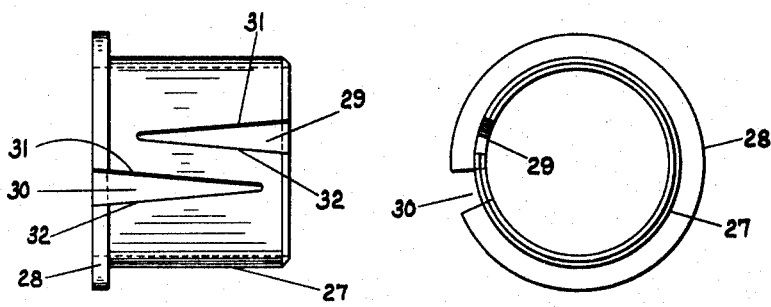
Fig.5     Fig.6
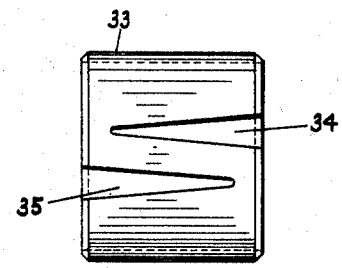
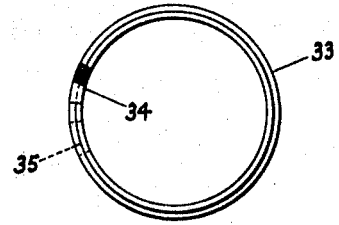
Fig.7     Fig.8
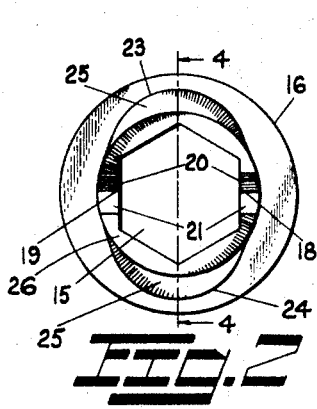 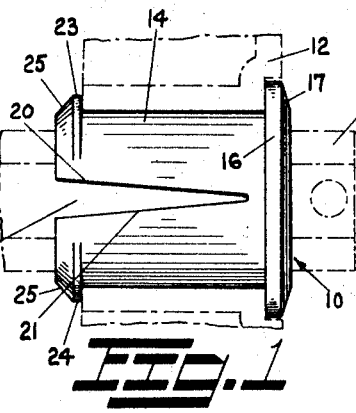 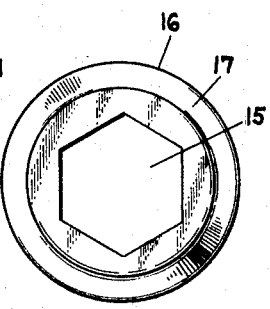
Fig.2     Fig.1     Fig.3
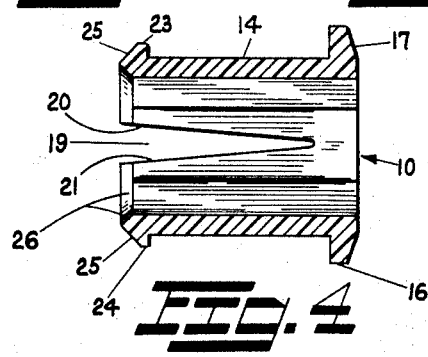
Fig.4
INVENTOR.
ALAN J. STONE
BY
*Albert A. Mahassel*
ATTORNEY

United States Patent Office 3,438,686
Patented Apr. 15, 1969

3,438,686
BEARING SUPPORT BUSHING
Alan J. Stone, Honeoye, N.Y., assignor, by mesne assignments, to Murray Company of Texas Inc., a corporation of Delaware
Filed Jan. 23, 1967, Ser. No. 611,147
Int. Cl. F16c *33/00, 43/00*
U.S. Cl. 308—238                                   1 Claim

ABSTRACT OF THE DISCLOSURE

A bearing support bushing having axially extending reliefs communicating with one end thereof which provides a means for compressing said bushing to facilitate its assembly within a bearing member.

Background of the invention

The invention relates to article handling conveyors of the endless belt type which utilize freely rotatable rollers for supporting and guiding the endless belt.

The roller members normally have bearing members assembled in each end thereof with a centrally disposed supporting shaft or rod extending therethrough.

In conveyor installations which utilize a non-rotating roller supporting shaft, it has been found advantageous to provide replaceable bushings on said shafts as a bearing surface for the bearing members assembled in the ends of the rollers.

The bearing support bushing according to the instant invention is made of a plastic material having suitable bearing qualities and being relatively inexpensive to manufacture. It provides an uncomplicated means of bushing replacement without the aid of special tools.

This bushing has a centrally disposed aperture of a configuration conforming to the supporting shaft on which it is quickly assembled by means of a slide fit. The bushing itself is compressible to facilitate its assembly within its roll end bearing and in the preferred embodiment utilizes integrally formed flanges for controlling the position of assembly in said bearing as well as to prevent the entry of foreign matter between the bushing and bearing.

Summary of the invention

The bushing of the present invention includes a cylindrical body portion having axially extending reliefs therein which communicate with one end of the bushing and are defined by tapered edges which narrow in the direction of and terminate short of the bushing's opposite end. In one concept of bushing, the reliefs are adjacently disposed and oppositely directed, and in another are disposed in diametrically opposed relation.

The bushing's axially extending reliefs permits the diameter of the body portion to be decreased by compression and with the aid of a tapered end the bushing is quickly and easily assembled in its respective bearing prior to being slid onto the supporting shaft.

Brief description of the drawing

FIG 1 is a view in side elevation of the bushing according to the invention and showing by means of phantom lines a portion of the bearing member within which it assembles and the supporting shaft extending therethrough;

FIGS. 2 and 3 are end views of the bearing member shown in FIG. 1;

FIG. 4 is a sectional view taken along line 4—4 of FIG. 2;

FIG. 5 is a view in side elevation of a modified form of flange bushing having oppositely directed reliefs adjacently disposed;

FIG. 6 is an end view of the bushing shown in FIG. 5 and

FIGS. 7 and 8 are views similar to FIGS. 5 and 6, respectively, but showing a bushing of the sleeve type.

Description of the preferred embodiment

Now referring to the figures of drawing enough of a roll end bearing and supporting shaft therefor are shown in FIG. 1 to serve as a basis for a detailed description of the invention applied thereto.

In FIG. 1 the bushing according to the invention is depicted generally by numeral 10 and is shown assembled on a hexagonal shaft 11 and centrally located within a partially shown roll end bearing 12.

The bushing includes a cylindrical body portion 14 having a hexagonal bore 15 to accommodate a supporting shaft of like configuration. It should be understood, however, that the bore 15 can be formed to any desired shape to receive the means for supporting the bushing and its roll end bearing.

One end of the bushing 10 is provided with an integrally formed annular flange 16 which is tapered as at 17 on its outer side for reducing the possibility of entry of foreign materials onto the contact surfaces of the bushing and bearing members.

As shown in FIGS. 1, 2 and 4 the body portion 14 of the bushing is provided with a pair of axially extending reliefs 18 and 19 which are disposed in diametrically opposed relation. These reliefs communicate with that end of the bushing opposite the end provided with the annular flange 16 and are defined by tapered edges 20 and 21 which narrow in the direction of said flange and terminate adjacent thereto.

That end of the bushing with which the reliefs communicate is provided with a pair of diametrically opposed and integrally formed semi-circular flanges 23 and 24 (FIGS. 1, 2 and 4) which are positioned intermediate said reliefs. Flanges 23 and 24 are tapered as at 25 and serve to facilitate assembly of the bushing within the bearing 12 and the flanges 23 and 24 cooperate with the annular flange 16 to maintain the assembled position of the bushing.

An internal chamfer 26 is provided in that end of the bushing opposite the annular flange 16 and provides a means for guiding the bushing onto the shaft 11.

In FIGS. 5 and 6 a modified form of bushing is shown which includes a cylindrical body portion 27 a flange 28 integrally formed at one end thereof and a pair of reliefs 29 and 30 which are adjacently disposed and oppositely directed. Relief 29 communicates with one end of the bushing and relief 30 communicates with the opposite end of the flange 28. As with the reliefs in the bushing shown in FIGS. 1, 2 and 4, reliefs 29 and 30 are defined by tapered edges 31 and 32 which narrow in the direction of the ends of the bushing and terminate adjacent said ends.

The bushing shown in FIGS. 7 and 8 is like that shown in FIGS. 5 and 6 but is of the sleeve type having a cylindrical body portion that is identified by numeral 33 and a pair of reliefs 34 and 35 which are also adjacently disposed and oppositely directed.

The assembly of a bushing according to the invention simply requires compressing the body portion to decrease the diameter thereof which is then easily inserted into the roll end bearing. The reliefs as well as permitting compression of bushing's body portion, serve as pockets for the collection of possible foreign particles and wear dust thereby increasing the operating life of the bushing and bearing.

The maintenance of a continuous circumference along at least a portion of the periphery of the bushing permits a predetermined fixed fit between the encompassing bearing, bushing and supporting shaft.

While one embodiment and a modification of the invention have been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:

1. A bushing for supporting a roll end bearing adapted to be superimposed thereupon, said bushing comprising a cylindrical body portion, a pair of axially extending reliefs disposed in diametrically opposed relation in said body portion and communicating with one end thereof and terminating short of the opposite end, said reliefs being defined by tapered edges which narrow in the direction of said opposite end, an integrally formed flange forming that end of said body portion with which said reliefs cooperate to facilitate assembly in said roll end bearing and retention of the latter on said body portion, said opposite end of the body portion including an integrally formed annular flange for controlling the position of assembly in said roll end bearing and to prevent entry of foreign matter between said bushing and bearing.

References Cited

UNITED STATES PATENTS

| 1,849,963 | 3/1932 | Snow | 308—237 |
| 3,203,304 | 8/1965 | Rapata | 85—84 X |
| 3,033,624 | 5/1962 | Biescker | 308—15 X |
| 3,164,054 | 1/1965 | Biescker | 85—84 X |
| 3,261,647 | 7/1966 | Stewart | 308—3.8 |
| 3,366,356 | 1/1968 | Fisher | 308—22 |

LAURENCE M. GOODRIDGE, *Primary Examiner.*

U.S. Cl. X.R.

85—84